United States Patent
Ito et al.

(10) Patent No.: US 12,435,464 B2
(45) Date of Patent: Oct. 7, 2025

(54) TREATMENT AGENT, FLAME RESISTANT FIBER NONWOVEN FABRIC, CARBON FIBER NONWOVEN FABRIC, AND METHODS FOR PRODUCING SAME

(71) Applicant: TAKEMOTO YUSHI KABUSHIKI KAISHA, Aichi-ken (JP)

(72) Inventors: Jun Ito, Gamagori (JP); Keiichiro Oshima, Gamagori (JP)

(73) Assignee: TAKEMOTO YUSHI KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/631,286

(22) PCT Filed: Jan. 20, 2021

(86) PCT No.: PCT/JP2021/001747
§ 371 (c)(1),
(2) Date: Jan. 28, 2022

(87) PCT Pub. No.: WO2021/157347
PCT Pub. Date: Aug. 12, 2021

(65) Prior Publication Data
US 2022/0364302 A1 Nov. 17, 2022

(30) Foreign Application Priority Data
Feb. 6, 2020 (JP) ................................ 2020-018883

(51) Int. Cl.
| | | |
|---|---|---|
| *D06M 15/53* | (2006.01) | |
| *D04H 1/4242* | (2012.01) | |
| *D04H 1/43* | (2012.01) | |
| *D04H 1/74* | (2006.01) | |
| *D04H 3/002* | (2012.01) | |
| *D04H 3/007* | (2012.01) | |
| *D04H 3/02* | (2006.01) | |
| *D06M 101/28* | (2006.01) | |
| *D06M 101/40* | (2006.01) | |

(52) U.S. Cl.
CPC .......... *D06M 15/53* (2013.01); *D04H 1/4242* (2013.01); *D04H 1/43* (2013.01); *D04H 3/002* (2013.01); *D04H 3/007* (2013.01); *D04H 3/02* (2013.01); *D06M 2101/28* (2013.01); *D06M 2101/40* (2013.01); *D06M 2200/30* (2013.01); *D10B 2101/12* (2013.01); *D10B 2401/04* (2013.01)

(58) Field of Classification Search
CPC ............ D06M 15/53; D06M 2210/40; D06M 2101/28; D06M 2200/30; D01F 9/22; D04H 1/4242; D04H 1/43; D04H 1/74; D04H 3/002; D04H 3/007; D04H 3/02; D10B 2101/12
See application file for complete search history.

(56) References Cited

U.S. PATENT DOCUMENTS

| | | | | |
|---|---|---|---|---|
| 4,999,869 A | * | 3/1991 | Holland | D06M 15/53 8/115.56 |
| 5,447,991 A | * | 9/1995 | Landoni | C08G 63/6926 525/167 |
| 6,299,789 B1 | * | 10/2001 | Tatemoto | D06M 15/53 252/8.84 |
| 10,550,512 B2 | | 2/2020 | Aso et al. | |
| 2006/0003649 A1 | * | 1/2006 | Runge | A61Q 19/10 442/97 |
| 2006/0093747 A1 | * | 5/2006 | Yamakita | D06M 15/643 8/112 |
| 2011/0198543 A1 | * | 8/2011 | Tarumoto | C09C 1/56 252/511 |
| 2012/0202963 A1 | * | 8/2012 | Suzuki | C08G 65/2663 528/275 |
| 2014/0031443 A1 | * | 1/2014 | Sasaki | C08G 18/4866 521/115 |
| 2014/0134094 A1 | | 5/2014 | Aso et al. | |
| 2014/0262088 A1 | * | 9/2014 | Deka | D04H 1/4242 162/146 |
| 2017/0284016 A1 | * | 10/2017 | Aso | D06M 15/6436 |
| 2018/0000979 A1 | * | 1/2018 | Sekifuji | A61L 15/26 |
| 2019/0360149 A1 | * | 11/2019 | Sakai | D04H 1/4291 |
| 2021/0002820 A1 | | 1/2021 | Maeda et al. | |

FOREIGN PATENT DOCUMENTS

| | | | | |
|---|---|---|---|---|
| EP | 1602778 A1 | * | 12/2005 | .......... D06M 13/165 |
| JP | 59144679 A | | 8/1984 | |
| JP | 0465338 A | | 3/1992 | |
| JP | 2001089976 A | | 4/2001 | |

(Continued)

OTHER PUBLICATIONS

Vegetable Oils: Types and Properties, Editor(s): Benjamin Caballero, Encyclopedia of Food Sciences and Nutrition (Second Edition), Academic Press, 2003.*
English Machine Translation JP 2019183377.*
Office Action for Chinese Application No. 202180004890.1 mailed Jul. 6, 2022, 15 pages.
International Search Report for Application No. PCT/JP2021/001747 mailed Apr. 13, 2021.
Extended European Search Report for EP Patent App. No. 21750875.3; Date of Mailing: Dec. 13, 2022, 6 pages.

*Primary Examiner* — Jennifer A Gillett
(74) *Attorney, Agent, or Firm* — CANTOR COLBURN LLP

(57) ABSTRACT

Disclosed is a treatment agent for flame-resistant fiber nonwoven fabric production or for carbon fiber nonwoven fabric production. The treatment agent contains a polyether compound in which ethylene oxide and propylene oxide are added to an alcohol. Also disclosed is a flame-resistant fiber nonwoven fabric or carbon fiber nonwoven fabric that includes the treatment agent adhered thereto.

4 Claims, No Drawings

(56) References Cited

FOREIGN PATENT DOCUMENTS

| | | |
|---|---|---|
| JP | 2003055843 A | 2/2003 |
| JP | 2003055878 A | 2/2003 |
| JP | 2004188284 A | 7/2004 |
| JP | 2004300601 A | 10/2004 |
| JP | 2005232599 A | 9/2005 |
| JP | 2006274507 A | 10/2006 |
| JP | 5842695 B2 * | 1/2016 |
| JP | 2017066541 A | 4/2017 |
| JP | 2019099942 A | 6/2019 |
| JP | 2019183377 A | 10/2019 |
| JP | 6632016 B1 | 1/2020 |
| KR | 1020140006099 A | 1/2014 |
| WO | 2019240264 A1 | 12/2019 |

\* cited by examiner

TREATMENT AGENT, FLAME RESISTANT FIBER NONWOVEN FABRIC, CARBON FIBER NONWOVEN FABRIC, AND METHODS FOR PRODUCING SAME

TECHNICAL FIELD

The present invention relates to a treatment agent, a flame-resistant fiber nonwoven fabric, a carbon fiber nonwoven fabric, and methods for producing the same.

BACKGROUND ART

Generally, carbon fibers or flame-resistant fibers are widely used in respective fields of building materials, transportation equipment, etc., for example, as a carbon fiber composite or a flame-retardant/fireproof material in combination with a matrix resin such as an epoxy resin. Carbon fibers are manufactured, for example, through a step of spinning acrylic fibers as carbon fiber precursors, a step of stretching the fibers, a flameproofing step, and a carbonization step.

Besides being formed into a woven fabric, carbon fibers or flame-resistant fibers are at times formed into and used as a nonwoven fabric that is obtained using a roller card (carding machine). When producing a nonwoven fabric, from a standpoint of imparting various characteristics such as card passing property to raw material fibers, a process of adhering a treatment agent for nonwoven fabric production that contains a phosphorus organic compound to the surfaces of the fibers may be performed.

Conventionally, the treatment agent disclosed in Patent Document 1 is known. Patent Document 1 discloses a step of adhering the treatment agent, which contains trihydroxyethyl phosphate as a phosphorus organic compound, to polyacrylonitrile oxidized fibers and thereafter performing processing into a nonwoven fabric.

PRIOR ART LITERATURE

Patent Literature

Patent Document 1: Japanese Laid-Open Patent Publication No. 2003-55878

SUMMARY OF THE INVENTION

Problems that the Invention is to Solve

However, with the conventional treatment agents, there are problems in that when fibers pass through a carding machine, a fiber opening property of carded web fibers is insufficient and a phenomenon of embedding of fibers in a cylinder of the carding machine also occurs.

A problem to be solved by the present invention is to provide a treatment agent, a flame-resistant fiber nonwoven fabric, a carbon fiber nonwoven fabric, and methods for producing the same by which the fiber opening property can be improved and the embedding phenomenon of fibers can be suppressed.

Means for Solving the Problems

As a result of performing research toward solving the above problem, the inventors of the present application found that a treatment agent for flame-resistant fiber nonwoven fabric production or for carbon fiber nonwoven fabric production that contains a polyether compound in which ethylene oxide and propylene oxide are added to an alcohol is truly favorable.

To solve the above problems, a treatment agent for flame-resistant fiber nonwoven fabric production or for carbon fiber nonwoven fabric production according to one aspect of the present invention is characterized by containing a polyether compound in which ethylene oxide and propylene oxide are added to an alcohol.

Preferably with the treatment agent, the polyether compound has a mass average molecular weight of 8,000 to 40,000.

Preferably with the treatment agent, the polyether compound is such that when the molar ratio in total of ethylene oxide and propylene oxide added in the molecule is taken as 100% by mol, ethylene oxide is added at a ratio of 25% to 95% by mol to the alcohol and propylene oxide is added at a ratio of 75% to 5% by mol to the alcohol.

Preferably with the treatment agent, the alcohol comprises an aliphatic alcohol that is trihydric.

To solve the above problems, a method for producing a flame-resistant fiber nonwoven fabric according to another aspect of the present invention is characterized in that the method includes adhering the treatment agent described above to flame-resistant fibers and thereafter obtaining a flame-resistant fiber nonwoven fabric.

To solve the above problems, a method for producing a carbon fiber nonwoven fabric according to another aspect of the present invention is characterized in that the method includes adhering the treatment agent described above to carbon fibers and thereafter obtaining a carbon fiber nonwoven fabric.

To solve the above problems, a flame-resistant fiber nonwoven fabric or a carbon fiber nonwoven fabric according to another aspect of the present invention is characterized by including a treatment agent for flame-resistant fiber nonwoven fabric production or for carbon fiber nonwoven fabric production adhered thereto, wherein the treatment agent contains a polyether compound in which ethylene oxide and propylene oxide are added to an alcohol, and the polyether compound has a mass average molecular weight of 8,000 to 40,000.

Effect of the Invention

The present invention succeeds in improving the fiber opening property and suppressing the embedding phenomenon of fibers.

MODES FOR CARRYING OUT THE INVENTION

First Embodiment

A first embodiment will now be described that embodies a treatment agent for flame-resistant fiber nonwoven fabric production or for carbon fiber nonwoven fabric production according to the present invention (hereinafter referred to simply as treatment agent in some cases). The treatment agent of the present embodiment contains a polyether compound in which ethylene oxide and propylene oxide are added to an alcohol (hereinafter referred to as polyether compound). With the polyether compound, a fiber opening property can be improved and an embedding phenomenon of fibers can also be suppressed.

The alcohol that is to be a raw material may be a monohydric alcohol or a polyhydric alcohol or an aromatic alcohol. Specific examples of the alcohol include (1) straight-chain alkyl alcohols, such as methanol, ethanol, propanol, butanol, pentanol, hexanol, octanol, nonanol, decanol, undecanol, dodecanol, tridecanol, tetradecanol, pentadecanol, hexadecanol, heptadecanol, octadecanol, nonadecanol, eicosanol, heneicosanol, docosanol, tricosanol, tetracosanol, pentacosanol, hexacosanol, heptacosanol, octacosanol, nonacosanol, and triacontanol, (2) branched alkyl alcohols, such as isopropanol, isobutanol, isohexanol, 2-ethylhexanol, isononanol, isodecanol, isotridecanol, isotetradecanol, isotriacontanol, isohexadecanol, isoheptadecanol, isooctadecanol, isononadecanol, isoeicosanol, isoheneicosanol, isodocosanol, isotricosanol, isotetracosanol, isopentacosanol, isohexacosanol, isoheptacosanol, isooctacosanol, isononacosanol, and isopentadecanol, (3) straight-chain alkenyl alcohols, such as tetradecenol, hexadecenol, heptadecenol, octadecenol, and nonadecenol, (4) branched alkenyl alcohols, such as isohexadecenol and isooctadecenol, (5) cyclic alkyl alcohols, such as cyclopentanol and cyclohexanol, (6) aromatic alcohols, such as phenol, benzyl alcohol, monostyrenated phenol, distyrenated phenol, and tristyrenated phenol, (7) polyhydric alcohols, such as ethylene glycol, propylene glycol, 1,3-propanediol, 1,2-butanediol, 1,3-butanediol, 1,4-butanediol, 1,4-butanediol, 2-methyl-1,2-propanediol, 1,5-pentanediol, 1,6-hexanediol, 2,5-hexanediol, 2-methyl-2,4-pentanediol, 2,3-dimethyl-2,3-butanediol, glycerin, 2-methyl-2-hydroxymethyl-1,3-propanediol, 2-ethyl-2-hydroxymethyl-1,3-propanediol, trimethylolpropane, sorbitan, pentaerythritol, and sorbitol. Among the above alcohols, it is preferable for a trihydric aliphatic alcohol, such as glycerin, 2-methyl-2-hydroxymethyl-1,3-propanediol, 2-ethyl-2-hydroxymethyl-1,3-propanediol, or trimethylolpropane, to be contained. By using a trihydric aliphatic alcohol, the effects of the present invention are improved further.

Although the number of added moles of ethylene oxide is set as appropriate, it is preferably 20 to 500 moles and more preferably 25 to 440 moles. Although the number of added moles of propylene oxide is set as appropriate, it is preferably 10 to 300 moles and more preferably 15 to 250 moles. Although the total of the number of added moles of ethylene oxide and the number of added moles of propylene oxide is set as appropriate, it is preferably 30 to 800 moles and more preferably 40 to 750 moles. By specifying the numbers to be within the above ranges, the effects of the present invention are improved further. Here, the number of added moles of ethylene oxide or propylene oxide represents the number of moles of ethylene oxide with respect to 1 mole of the alcohol in the charged raw material. The alkylene oxide may be arranged as a random adduct or as a block adduct.

In the polyether compound, when the molar ratio in total of ethylene oxide and propylene oxide added in the molecule is taken as 100% by mol, it is preferable for ethylene oxide to be added at a ratio of 25% to 95% by mol to the alcohol and propylene oxide to be added at a ratio of 75% to 5% by mol to the alcohol. If the molar ratio of ethylene oxide is not less than 25% by mol and the molar ratio of propylene oxide is not more than 75% by mol, the fiber opening property is improved further in particular. If the molar ratio of ethylene oxide is not more than 95% by mol and the molar ratio of propylene oxide is not less than 5% by mol, the embedding phenomenon of fibers can be suppressed further in particular.

Although the mass average molecular weight of the polyether compound is not restricted in particular, it is preferably 8,000 to 40,000 and more preferably 8,500 to 35,000. By specifying to this range, the fiber opening property is improved further in particular. Here, the mass average molecular weight of the polyether compound can be measured using gel permeation chromatography (GPC).

As the polyether compound described above, one type of polyether compound may be used alone or two or more types may be used in appropriate combination.

Second Embodiment

Next, a second embodiment will be described that embodies a flame-resistant fiber nonwoven fabric and a carbon fiber nonwoven fabric (hereinafter referred to simply as nonwoven fabric) or methods for producing the same. The treatment agent of the first embodiment is adhered to the nonwoven fabric of the present embodiment. The nonwoven fabric of the present embodiment are manufactured by first performing a step of adhering the treatment agent of the first embodiment to flame-resistant fibers or carbon fibers and then performing a web forming step by carding. Although an adhesion amount of the treatment agent with respect to the nonwoven fabric is not restricted in particular, the treatment agent (not containing a solvent) is adhered such as to be preferably 0.01% to 10% by mass and more preferably 0.1% to 2% by mass to the nonwoven fabric.

Although the types of flame-resistant fibers and carbon fibers constituting a nonwoven fabric are not restricted in particular, examples thereof include PAN-based fibers obtained using acrylic fibers as raw material and pitch-based fibers obtained using pitch as raw material. For example, when acrylic fibers are used, the acrylic fibers are preferably constituted of fibers having a polyacrylonitrile obtained by copolymerizing at least not less than 90% by mol of acrylonitrile and not more than 10% by mol of a flame-resistance promoting component as a main component. As the flame-resistance promoting component, for example, a vinyl group-containing compound can be used favorably that has copolymerizability with acrylonitrile. Although a single fiber fineness of the raw material fibers is not restricted in particular, it is preferably 0.1 to 2.0 dTex from a standpoint of balance of performance and manufacturing cost. Also, although the number of single fibers constituting a fiber bundle of the raw material fibers is not restricted in particular, it is preferably 1,000 to 96,000 fibers from a standpoint of balance of performance and manufacturing cost.

In a method for producing flame-resistant fibers or carbon fibers of the present embodiment, first, after obtaining the raw material fibers described above, a yarn manufacturing step of manufacturing a yarn is performed. Next, a flame-resistant step of converting the fiber bundle manufactured in the yarn manufacturing step into flame-resistant fibers in an oxidizing atmosphere of 200° C. to 300° C. and preferably 230° C. to 270° C. is performed. Further, if carbon fibers are to be obtained, a carbonization step of carbonizing the flame-resistant fibers in an inert atmosphere of 300° C. to 2,000° C. and preferably 300° C. to 1,300° C. is performed. The carbonization step may be performed in continuation to the flame-resistant step.

In a method for producing a nonwoven fabric of the present invention, first, as mentioned above, the step of adhering the treatment agent of the first embodiment to the flame-resistant fibers or the carbon fibers is performed. A known method can be adopted as a method for adhering the treatment agent to the flame-resistant fibers or the carbon fibers as appropriate. A method that is generally used industrially, for example, an immersion oiling method, a roller immersion method, a roller contact method, a spraying method, a papermaking method, or a guide oiling method using a metering pump can be applied.

The form of the treatment agent of the first embodiment when the treatment agent is adhered onto the fibers may be, for example, an organic solvent solution or an aqueous liquid. The treatment agent is preferably adhered to the flame-resistant fibers or the carbon fibers in a state of an aqueous emulsion liquid. The length of the fibers to which the treatment agent is applied is not restricted in particular and short fibers, generally called staples, and long fibers, generally called filaments, can be used.

By then performing drying to remove the water or other solvent contained in the solution of the treatment agent, flame-resistant fiber strands or carbon fiber strands can be obtained. For the drying here, a method using, for example, hot air, a hot plate, a roller, or any of various infrared heaters as a heating medium can be adopted.

Next, the web forming step is performed. The web forming step includes carding the flame-resistant fibers or the carbon fibers to which the treatment agent is adhered to produce a web constituted of a nonwoven fabric. The carding can be performed using a known carding machine. Example thereof include a flat card, a combination card, and a roller card.

Actions and effects of the treatment agent, the flame-resistant fiber nonwoven fabric, the carbon fiber nonwoven fabric, and the methods for producing the same of the embodiments will now be described.

In the embodiments, the treatment agent for flame-resistant fiber nonwoven fabric production or for carbon fiber nonwoven fabric production, which is applied to the fibers before producing the nonwoven fabric, contains a polyether compound in which ethylene oxide and propylene oxide are added to an alcohol. Therefore, when a nonwoven fabric is formed from the flame-resistant fibers or the carbon fibers using a carding machine, the fiber opening property of the card web fibers can be improved. Also, the embedding phenomenon of fibers in a cylinder of the carding machine can be suppressed.

The embodiments described above may be changed as follows.

As a stabilizer or an antistatic agent for quality maintenance of the treatment agent according to the embodiments, a surfactant, an antistatic agent, a binder, an antioxidant, an ultraviolet absorber, or other component besides those mentioned above and ordinarily used in a treatment agent may further be mixed in the treatment agent within a range that does not impair the effects of the present invention.

EXAMPLES

Examples will now be given below to described the features and effects of the present invention more specifically, but the present invention is not limited to these examples. In the following description of working examples and comparative examples, "part" means "part by mass" and "%" means "% by mass."

Experimental Part 1 (Synthesis of Polyether Compound)

After adding 1 mole of glycerin (A-1) as the alcohol and an appropriate amount of potassium hydroxide as a catalyst to an autoclave reactor and raising the temperature to 100° C. while stirring, decompression dehydration was performed. Thereafter, the temperature was raised to 130° C. while continuing to stir and 110 moles of ethylene oxide (EO) and 110 moles of propylene oxide (PO) were added gradually and made to undergo random addition. A polyether compound with an EO/PO molar ratio of 50/50 and a mass average molecular weight of 11,300 that is used in Example 1 and Example 14 was thereby obtained.

Also, polyether compounds used in other examples shown in Table 1 were synthesized by the same procedures as those for the polyether compound used in Example 1. The polyoxyalkylene chain of the polyether compound used in each example was synthesized as a random adduct.

The type of the raw material alcohol, the numbers of moles of ethylene oxide (EO) and propylene oxide (PO) added in the polyether compound with respect to 1 mole of the alcohol, the EO/PO molar ratio, the mass average molecular weight, and the content of the polyether compound or the type and the content of another compound used in each example are as indicated in the "Polyether compound" column and the "Other compound" column of Table 1.

Experimental Part 2 (Preparation of Treatment Agent for Flame-Resistant Fiber Nonwoven Fabric Production or for Carbon Fiber Nonwoven Fabric Production)

As shown in Table 1, the treatment agent of Example 1 was prepared by adding ion exchanged water gradually while stirring to the polyether compound such that a concentration of solids became 30%.

The treatment agents of Examples 2 to 20 and Comparative Examples 1 to 8 were prepared using the polyether compound or other compound shown in Table 1 and by the same procedures as those for the treatment agent of Example 1.

TABLE 1

| | | | Polyether compound | | | | | Other compound | | Evaluations | |
|---|---|---|---|---|---|---|---|---|---|---|---|
| Category | Fiber type | Alcohol | Number of moles of ethylene oxide (EO) added | Number of moles of propylene oxide (PO) added | EO/PO molar ratio | Mass average molecular weight | Ratio (% by mass) | Type | Ratio (% by mass) | Fiber opening property | Embedding phenomenon |
| Example 1 | Carbon fibers | A-1 | 110 | 110 | 50/50 | 11300 | 100 | — | — | 4 | 3 |
| Example 2 | Carbon fibers | A-1 | 420 | 250 | 63/37 | 33400 | 100 | — | — | 4 | 3 |
| Example 3 | Carbon fibers | A-1 | 300 | 30 | 91/9 | 15100 | 100 | — | — | 4 | 3 |

TABLE 1-continued

| Category | Fiber type | Polyether compound | | | | | Other compound | | Evaluations | |
|---|---|---|---|---|---|---|---|---|---|---|
| | | Alcohol | Number of moles of ethylene oxide (EO) added | Number of moles of propylene oxide (PO) added | EO/PO molar ratio | Mass average molecular weight | Ratio (% by mass) | Type | Ratio (% by mass) | Fiber opening property | Embedding phenomenon |
| Example 4 | Carbon fibers | A-1 | 140 | 230 | 38/62 | 19600 | 100 | — | — | 4 | 3 |
| Example 5 | Carbon fibers | A-1 | 45 | 110 | 29/71 | 8500 | 100 | — | — | 4 | 3 |
| Example 6 | Carbon fibers | A-1 | 50 | 60 | 45/55 | 5800 | 100 | — | — | 3 | 3 |
| Example 7 | Carbon fibers | A-2 | 50 | 50 | 50/50 | 5200 | 100 | — | — | 3 | 3 |
| Example 8 | Carbon fibers | A-1 | 40 | 200 | 17/83 | 13500 | 100 | — | — | 3 | 3 |
| Example 9 | Carbon fibers | A-1 | 400 | 10 | 98/2 | 18300 | 100 | — | — | 4 | 2 |
| Example 10 | Carbon fibers | A-3 | 180 | 50 | 78/22 | 11000 | 100 | — | — | 3 | 2 |
| Example 11 | Carbon fibers | A-3 | 25 | 10 | 71/29 | 1900 | 100 | — | — | 2 | 2 |
| Example 12 | Carbon fibers | A-4 | 50 | 200 | 20/80 | 14000 | 100 | — | — | 2 | 2 |
| Example 13 | Carbon fibers | A-5 | 90 | 10 | 90/10 | 4600 | 100 | — | — | 2 | 2 |
| Example 14 | Flame-resistant fibers | A-1 | 110 | 110 | 50/50 | 11300 | 100 | — | — | 4 | 3 |
| Example 15 | Flame-resistant fibers | A-2 | 50 | 50 | 50/50 | 5200 | 100 | — | — | 3 | 3 |
| Example 16 | Flame-resistant fibers | A-1 | 400 | 10 | 98/2 | 18300 | 100 | — | — | 4 | 2 |
| Example 17 | Flame-resistant fibers | A-3 | 180 | 50 | 78/22 | 11000 | 100 | — | — | 3 | 2 |
| Example 18 | Flame-resistant fibers | A-3 | 25 | 10 | 71/29 | 1900 | 100 | — | — | 2 | 2 |
| Example 19 | Flame-resistant fibers | A-4 | 50 | 200 | 20/80 | 14000 | 100 | — | — | 2 | 2 |
| Example 20 | Flame-resistant fibers | A-5 | 90 | 10 | 90/10 | 4600 | 100 | — | — | 2 | 2 |
| Comparative Example 1 | Carbon fibers | A-1 | 300 | 0 | 100/0 | 13300 | 100 | — | — | 1 | 1 |
| Comparative Example 2 | Carbon fibers | A-2 | 10 | 0 | 100/0 | 600 | 100 | — | — | 1 | 1 |
| Comparative Example 3 | Carbon fibers | — | — | — | — | — | — | B-1 | 100 | 1 | 1 |
| Comparative Example 4 | Carbon fibers | — | — | — | — | — | — | B-2 | 100 | 1 | 1 |
| Comparative Example 5 | Flame-resistant fibers | A-1 | 300 | 0 | 100/0 | 13300 | 100 | — | — | 1 | 1 |
| Comparative Example 6 | Flame-resistant fibers | A-2 | 10 | 0 | 100/0 | 600 | 100 | — | — | 1 | 1 |
| Comparative Example 7 | Flame-resistant fibers | — | — | — | — | — | — | B-1 | 100 | 1 | 1 |
| Comparative Example 8 | Flame-resistant fibers | — | — | — | — | — | — | B-2 | 100 | 1 | 1 |

In Table 1,
A-1 represents glycerin,
A-2 represents trimethylolpropane,
A-3 represents lauryl alcohol,
A-4 represents butanol,
A-5 represents propylene glycol,
B-1 represents trihydroxyethyl phosphate, and
B-2 represents potassium lauryl phosphate.

Experimental Part 3 (Production of Flame-Resistant Fiber Nonwoven Fabric and Carbon Fiber Nonwoven Fabric)

Flame-resistant fiber nonwoven fabrics and carbon fiber nonwoven fabrics were produced using the treatment agents for flame-resistant fiber nonwoven fabric production or for carbon fiber nonwoven fabric production that were prepared in Experimental Part 2.

A copolymer of 1.80 limiting viscosity constituted of 95% by mass acrylonitrile, 3.5% by mass methyl acrylate, and 1.5% by mass methacrylic acid was dissolved in dimethylacetamide (DMAC) to prepare a spinning dope with a polymer concentration of 21.0% by mass and a viscosity at 60° C. of 500 poise. The spinning dope was discharged at a draft ratio of 0.8 from a spinneret with 12,000 holes of 0.075 mm hole diameter (inner diameter) into a coagulation bath of a 70% by mass aqueous solution of DMAC maintained at a spinning bath temperature of 35° C.

The coagulated yarn was drawn by 5 times at the same time as being desolvated in a rinse tank to prepare acrylic fiber strands in a water-swollen state. These fiber strands were oiled with a 4% ion exchanged water solution of a known carbon fiber precursor treatment agent by an immersion method such that the adhesion amount of the carbon fiber precursor treatment agent would be 1% by mass (not including the solvent). Thereafter, the acrylic fiber strands were subject to dry densification by a heating roller set at 130° C., further subject to drawing by 1.7 times between heating rollers set at 170° C., and thereafter wound around a bobbin to obtain a carbon fiber precursor. Yarns were unwound from the carbon fiber precursor and subjected to a flame-resistant treatment under an air atmosphere of 200° C. to 300° C. to obtain flame-resistant fibers. Thereafter, the flame-resistant fibers were converted to carbon fibers by baking under a nitrogen atmosphere in a carbonizing furnace having a temperature gradient of 300° C. to 1,300° C. and then wound around a bobbin.

The flame-resistant fibers and the carbon fibers obtained as described above were respectively cut to 50 mm and then immersed in 2% aqueous solutions of the treatment agents prepared in Experimental Part 2 to obtain fibers with 1.0% as solids of treatment agent added on the fibers.

Using the fibers obtained, the fiber opening property and embedding phenomenon were evaluated as described below. The results are shown in the "Fiber opening property" column and the "Embedding phenomenon" column of Table 1.

Experimental Part 3 (Evaluation)

Embedding Phenomenon

In a step of forming a card web by subjecting 20 g of the flame-resistant fibers or carbon fibers processed with the treatment agent described above to conditioning for 24 hours inside a thermostatic chamber of 20° C. and 65% RH and thereafter supplying the fibers to a roller card (carding machine), the degree of embedding phenomenon of fibers in a cylinder was evaluated according to the following criteria.

Evaluation Criteria of Embedding Phenomenon
3: The embedding phenomenon of fibers in the cylinder is not seen at all.
2: The embedding phenomenon of fibers in the cylinder is hardly seen.
1: The embedding phenomenon of fibers in the cylinder is seen.

Fiber Opening Property

The fiber opening properties of the card webs prepared in the embedding phenomenon evaluation described above were visually evaluated according to the following criteria.
4: The fibers are dispersed completely uniformly and presence of fiber bundles is not seen at all.
3: The fibers are dispersed uniformly and presence of fiber bundles is hardly seen.
2: Although the fibers are generally dispersed uniformly, presence of fiber bundles is clearly seen in portions.
1: The dispersion state of the fibers is nonuniform and presence of fiber bundles is seen across the entirety.

As is clear from the evaluation results of the respective examples with respect to the respective comparative examples in Table 1, the treatment agent succeeds in improving the fiber opening property and suppressing the embedding phenomenon of fibers.

The invention claimed is:

1. A treatment agent for flame-resistant fiber nonwoven fabric production or for carbon fiber nonwoven fabric production, the treatment agent comprising a polyether compound in which ethylene oxide and propylene oxide are added to an alcohol, wherein the treatment agent is free of an organic phosphorous compound, the alcohol comprises an aliphatic alcohol that is trihydric, and the polyether compound has a mass average molecular weight of 13,500 to 40,000, wherein the polyether compound is such that when the molar ratio in total of ethylene oxide and propylene oxide added in the molecule is taken as 100% by mol, ethylene oxide is added at a ratio of 25% to 71% by mol to the alcohol and propylene oxide is added at a ratio of 75% to 29% by mol to the alcohol.

2. A method for producing a flame-resistant fiber nonwoven fabric, the method comprising adhering the treatment agent according to claim 1 to flame-resistant fibers and thereafter obtaining a flame-resistant fiber nonwoven fabric.

3. A method for producing a carbon fiber nonwoven fabric, the method comprising adhering the treatment agent according to claim 1 to carbon fibers and thereafter obtaining a carbon fiber nonwoven fabric.

4. A flame-resistant fiber nonwoven fabric or a carbon fiber nonwoven fabric, comprising a treatment agent for flame-resistant fiber nonwoven fabric production or for carbon fiber nonwoven fabric production adhered thereto, wherein the treatment agent contains a polyether compound in which ethylene oxide and propylene oxide are added to an alcohol, wherein the treatment agent is free of an organic phosphorous compound, the polyether compound has a mass average molecular weight of 8,000 to 40,000, and the alcohol comprises an aliphatic alcohol that is trihydric, wherein the polyether compound is such that when the molar ratio in total of ethylene oxide and propylene oxide added in the molecule is taken as 100% by mol, ethylene oxide is added at a ratio of 25% to 71% by mol to the alcohol and propylene oxide is added at a ratio of 75% to 29% by mol to the alcohol.

* * * * *